Oct. 14, 1930.                 G. E. WEBB                 1,778,052
AUTOMATIC FLOW CONTROL WATER MEASURING TANK
Filed Sept. 13, 1927
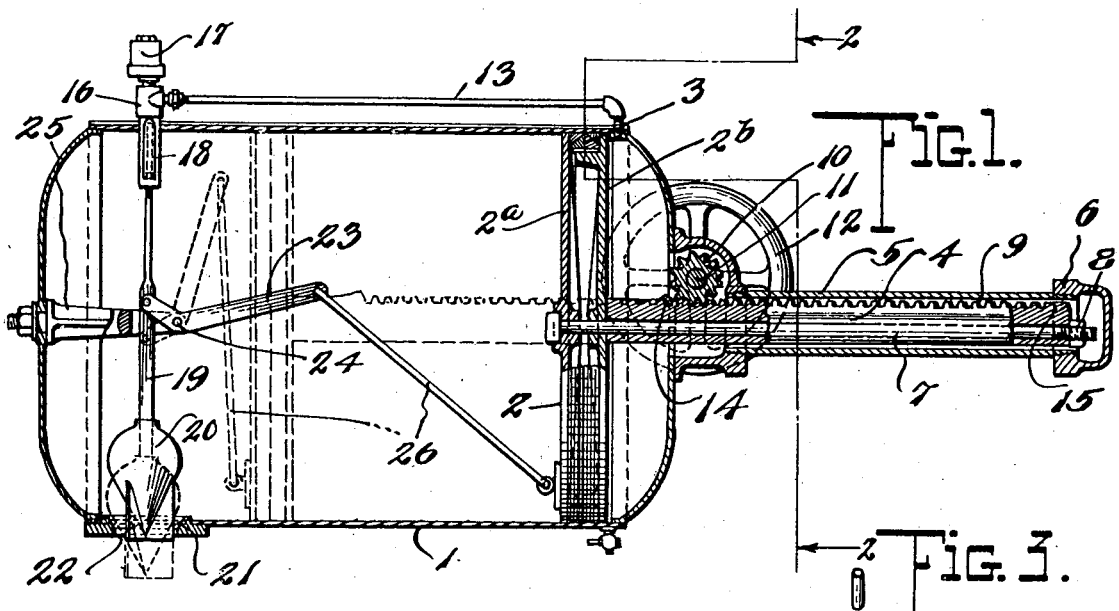
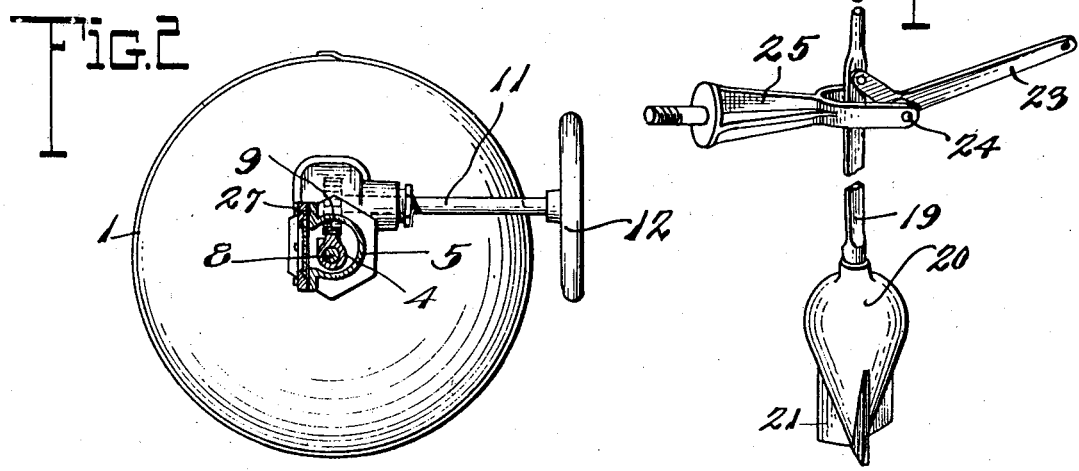
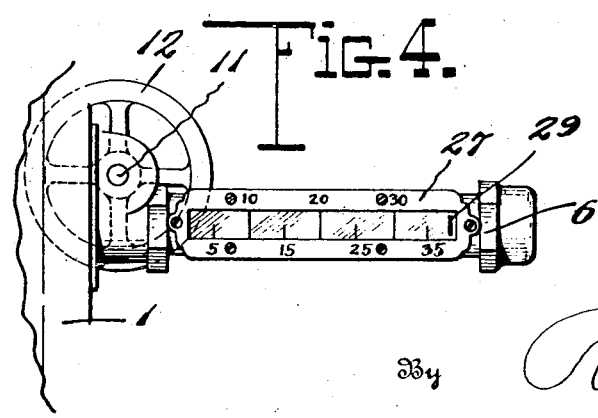
Inventor,
George E. Webb
By Robb & Robb
Attorneys Patented Oct. 14, 1930

1,778,052

UNITED STATES PATENT OFFICE

GEORGE EVANS WEBB, OF MILWAUKEE, WISCONSIN, ASSIGNOR TO KOEHRING COMPANY, OF MILWAUKEE, WISCONSIN, A CORPORATION

AUTOMATIC FLOW-CONTROL WATER-MEASURING TANK

Application filed September 13, 1927. Serial No. 219,263.

The present invention relates to improvements in water measuring tanks of the type used for delivering predetermined quantities of liquid to concrete mixers, and it has for its primary object to provide for such tanks an automatically regulatable flow control which will insure a continuous flow of the liquid for a constant period regardless of the variations in the quantity of the liquid to be delivered to the mixer.

It has been heretofore determined that the best results in mixing aggregates and cement are obtainable only where the water content is introduced into the mixer over a period of time which slightly overlaps the cycle of charging the dry materials thereinto and since this period is constant irrespective of the size of the batch, provision must be made to deliver the necessary amount of water which varies according to the size and consistency of the batch desired, so as to initiate slightly before the aggregate charging commences and terminate slightly after it ends.

To this end I have devised a flow control means cooperative with the discharge outlet of the tank, said means having suitable connection to the water measuring device and being adjustable relative to said outlet automatically by the adjustment of the water measuring means. For this purpose such means here set forth consists of a specially formed valve member, its peculiar design being particularly devised to prevent retardation of flow of the liquid by the stream of air which tends to move into the vortex which usually forms in the low stage of the water delivery, and to break up the whirl which develops the vortex.

It is further an object of these improvements to provide a novel construction of indicator associated with the adjustable water measuring means so that the operator may readily determine the adjustment both of the water measuring means and the flow control means.

Other objects and advantages of the invention will be hereinafter set forth and the novel features thereof defined by the appended claims.

In the accompanying drawing:—

Figure 1 is a longitudinal sectional view through a device embodying my improvements;

Figure 2 is a vertical sectional view on the line 2—2 of Figure 1;

Figure 3 is a detail view of the flow control unit; and

Figure 4 is a fragmentary view of the end of the measuring tank showing the indicator device.

Like reference characters designate corresponding parts throughout the several figures of the drawing.

In the embodiment herein set forth as one exemplification of the invention I employ a tank 1 of suitable form and construction, similar in type to that disclosed in my copending application Serial No. 141,169 filed October 12, 1926. Within this tank is reciprocally mounted the piston 2, the adjustment of which determines the quantity of water which will be received and delivered from the measuring tank. The piston in the construction depicted embodies the spaced heads $2^a$ and $2^b$ between the peripheral portions of which is received the expansible packing 3. This packing may be adjusted in relation to the wall of the tank by the adjustment of the heads of the piston, as will appear hereinafter. The head $2^b$ has projecting from it the stem 4 which is received in the tubular housing extension 5 supported from the end head of the tank, said housing being closed at its outer extremity by the removable cap 6. The stem is bored to receive the adjusting rod 7 having an adjusting nut 8 at the end thereof cooperating with the end of the stem 4 so as to draw the heads $2^a$ and $2^b$ more or less together as wear on the packing takes place. The top of the stem 4, furthermore, is provided with rack teeth 9 engaged by the pinion 10 mounted on the inner end of the shaft 11 which carries at its outer end the hand adjusting wheel 12. By operation of the wheel 12 in one direction or another the piston is shifted to its different positions for controlling the quantity of liquid to be handled by the tank. The opposite sides of the piston are placed in communication with each other through the conduit 13 so that equalization at opposite sides may be accomplished in the manner set forth in my co-pending application. Since these features do not form a part of the present invention they are not herein claimed and do not need further explanation.

The stem 4 of the piston, it should be noted, is provided with inner and outer stops 14 and 15 by means of which the limits of movements of the piston are controlled. The tank is provided with the fitting 16 with which the air valve 17 cooperates and this fitting also is provided with a gage or guide 18 extending into the tank and cooperating with the stem 19 of the flow control member or valve 20.

It will be noted that the valve member 20 is of peculiar form, tapering at its base portion so as to partake of the shape of a plumb-bob. The valve is positioned to co-operate with the outlet 21 of the tank to which outlet the usual three-way valve (not shown) is attached for controlling the admission of water to the tank and the discharge of the same to the mixer. This valve member is provided with a series of fins 22 which constitute guide means for the valve member and also perform the additional function of breaking up the whirl of the liquid which develops as the water is lowered in the tank in the discharge to the mixer as hereinbefore set forth.

The valve member is supported in relation to the outlet 21 so that its tapered base will project into the outlet more or less according to the adjustment and will fill or occupy the space usually in the center of the stream of water passing through the outlet. It has been found that the movement of air into the vortex of the liquid retards the movement of the water materially from the tank and by forming the valve member in the manner set forth to occupy the center of the vortex the interference of the air is eliminated.

The valve member is supported in relation to the opening by the actuator or angle lever 23 which is pivotally mounted at 24 in the bifurcated extremity of the bracket 25 fixed to the adjacent head of the tank. The lever 23 is connected by a link 26 to the piston 2 so that the horizontal reciprocatory movement of the piston is converted into vertical movement of the valve member and the latter is automatically adjusted by the adjustment of the piston. The arrangement is such that the operative area of the outlet will be properly proportioned according to the quantity of liquid which is to be delivered from the tank so that the flow will take place over a fixed period regardless of the quantity which is delivered.

It will be observed that a simple flow control mechanism is thus provided and that it is of a unitary character so as to be readily applicable to measuring tanks in use or to be manufactured of the type set forth.

In order to assist in determining the quantity of liquid to be delivered, one wall of the tubular extension 5 is formed by the indicator window 27. This window is suitably calibrated for the different quantities, as shown clearly in Figure 4 and provided with markings across the glass closure with which an indicator member 29 on the stem 4 of the piston coacts. A very quick adjustment may be made through the use of a simple mechanism of this character so that the tank may be caused to deliver accurately predetermined quantities of liquid.

Having thus described my invention, what I claim as new and desire to secure by Letters Patent of the United States, is:—

1. The combination with a water measuring tank having an outlet and means for varying the quantity of liquid delivered therefrom, of flow control means movable into and out of the outlet, and a connection between said control means and the quantity varying means to adjust the control means to proportion the flow in accordance with the quantity to be delivered.

2. The combination with a water measuring tank having an outlet and means for varying the quantity of liquid delivered therefrom, of flow control means within the tank comprising a member projecting into the outlet opening during the flow to prevent retardation of the flow incident to a vortex action of the liquid, said member having means to prevent whirling of the liquid in passing through said outlet.

3. In combination, a tank having an outlet, a piston therein, a valve member cooperating with said outlet, means for horizontally reciprocating the piston, and means intermediate the piston and valve member for converting the reciprocating motion of the piston into vertical motion of the valve member.

4. In combination, a tank having an outlet, a piston therein adjustable to determine the charge of water to be discharged at one time from the tank, a valve member cooperating with said outlet, a support for the valve member, a link connection between said support and the piston, and means for actuating the piston and valve member simultaneously and in a relationship such that the time of flow through the outlet will remain constant regardless of size of the charge.

5. In combination, a tank having an outlet, a piston therein adjustable to vary the capacity of the tank, a valve member disposed to cooperate with said outlet, an actuator for said valve member, a bracket on which said actuator is supported, and means connecting said actuator with the piston to regulate the quantity of flow from the tank proportionally to the capacity adjustment.

6. In combination, a tank having an outlet, means mounted therein adjustable for measuring a predetermined quantity of liquid, flow control means therein cooperating with the outlet and connected to said measuring means, means for actuating said measuring means and flow control means simultaneously in proportional relation, and an indicator associated with said actuating means for determining the quantity of liquid to be delivered.

7. A charge measuring device comprising a tank having adjustable charge regulating means associated therewith, said tank having a discharge outlet, and means automatically adjustable with the adjustment of the charge regulating means for determining the rate of flow of the charge through the outlet.

8. A tank having a discharge opening, means adjustable therein for determining the liquid charge receivable in said tank, means for regulating the rate of flow through the opening and proportioning the same to the size of the charge receivable in the tank.

9. In a water tank mechanism for a concrete mixing machine, the combination, with a tank having an orifice of means for enhancing the flow of liquid through the orifice incident to a vortex action of the liquid at said orifice, said means consisting of a member projecting into the orifice to prevent the creation of a vortex by the liquid flowing therethrough to supply a measured quantity of liquid to a mixer.

10. In a water tank mechanism for a concrete mixing machine, the combination, with a tank having an orifice, of means for enhancing the flow of liquid through the orifice incident to a vortex action of the liquid at said orifice, said means consisting of a member projecting into the orifice to prevent the creation of a vortex by the liquid flowing therethrough to supply a measured quantity of liquid to a mixer, and means for adjusting the position of said vortex preventing member with respect to the orifice to vary the flow of liquid passing therethrough.

11. In a water tank mechanism for concrete mixing machines, the combination, with a tank having an orifice, of means for enhancing the flow of liquid through the orifice incident to a vortex action of the liquid at said orifice, said means comprising a member having fins projecting into the orifice to prevent the creation of a vortex by the liquid flowing therethrough.

In testimony whereof I affix my signature.

GEORGE EVANS WEBB.